United States Patent
Pan

(10) Patent No.: US 9,377,112 B2
(45) Date of Patent: Jun. 28, 2016

(54) MIXING ADJUSTING THERMOSTATIC WATER VALVE WITH PRESSURE BALANCING DEVICE

(76) Inventor: Zhaokeng Pan, Foshan (CN)

(*) Notice: Subject to any disclaimer, the term of this patent is extended or adjusted under 35 U.S.C. 154(b) by 689 days.

(21) Appl. No.: 13/809,862

(22) PCT Filed: Jun. 21, 2011

(86) PCT No.: PCT/CN2011/076016
§ 371 (c)(1),
(2), (4) Date: Jan. 11, 2013

(87) PCT Pub. No.: WO2012/006921
PCT Pub. Date: Jan. 19, 2012

(65) Prior Publication Data
US 2013/0112762 A1    May 9, 2013

(30) Foreign Application Priority Data
Jul. 14, 2010 (CN) .......................... 2010 1 0232044

(51) Int. Cl.
*G05D 23/13* (2006.01)
*G05D 23/185* (2006.01)
*F16K 3/26* (2006.01)
*F16K 11/052* (2006.01)

(52) U.S. Cl.
CPC ............. *F16K 3/26* (2013.01); *F16K 11/052* (2013.01); *G05D 23/136* (2013.01); *G05D 23/1393* (2013.01)

(58) Field of Classification Search
CPC ....... F16K 3/26; F16K 11/052; G05D 23/136; G05D 23/1393; F16J 15/0893

USPC .............. 236/12.12, 12.11, 12.16, 12.23
See application file for complete search history.

(56) References Cited

U.S. PATENT DOCUMENTS 3,545,470 A * 12/1970 Paton ........................... 137/111
4,711,392 A * 12/1987 Kidouchi et al. .......... 236/12.12
(Continued)

FOREIGN PATENT DOCUMENTS

CN      201013964       *  3/2007
CN      2913766 Y          6/2007
(Continued)

OTHER PUBLICATIONS

International Search Report corresponding to International Application No. PCT/CN2011/076016, mailed Aug. 11, 2011.

*Primary Examiner* — Henry Crenshaw
(74) *Attorney, Agent, or Firm* — Amster, Rothstein & Ebenstein LLP

(57) ABSTRACT

A mixing adjusting thermostatic water valve with a pressure balancing device includes a valve body, a water temperature adjusting block and a temperature sensor. A left and a right pressure balancing cavities are arranged on two sides of the lower part of the inner cavity, and the two ends of the rack pass through the internal sidewalls of the left and right pressure balancing cavities. Left and right vertical platforms are arranged on two ends of the rack. A soft bowl type piston is arranged between the left and right vertical platforms and the internal sidewalls of the left and right pressure balancing cavities respectively to form the pressure balancing device. The valve is provided with the pressure balancing device, so that outlet water temperature can be stably adjusted when pressure difference of cold and hot water is more than 0.6MPa.

8 Claims, 1 Drawing Sheet

(56) References Cited

U.S. PATENT DOCUMENTS

| | | |
|---|---|---|
| 6,220,299 B1 * | 4/2001 | Arvidsson et al. ............ 137/863 |
| 6,250,559 B1 | 6/2001 | Knauss |
| 6,484,754 B1 * | 11/2002 | Muth et al. ............... 137/625.66 |
| 6,561,217 B1 * | 5/2003 | Pan ........................... 137/487.5 |
| 2003/0189184 A1 * | 10/2003 | York et al. .................... 251/250 |
| 2005/0011563 A1 * | 1/2005 | Alacqua et al. .............. 137/875 |
| 2005/0258258 A1 * | 11/2005 | Jonte .......................... 236/12.15 |
| 2006/0196565 A1 * | 9/2006 | Pechtold .................. 137/625.44 |
| 2009/0178712 A1 * | 7/2009 | Broadbent et al. ................. 137/1 |

FOREIGN PATENT DOCUMENTS

| | | |
|---|---|---|
| CN | 201013964 Y | 1/2008 |
| CN | 100516605 C | 7/2009 |
| CN | 101893114 A | 11/2010 |
| EP | 1450083 A1 | 8/2004 |

* cited by examiner

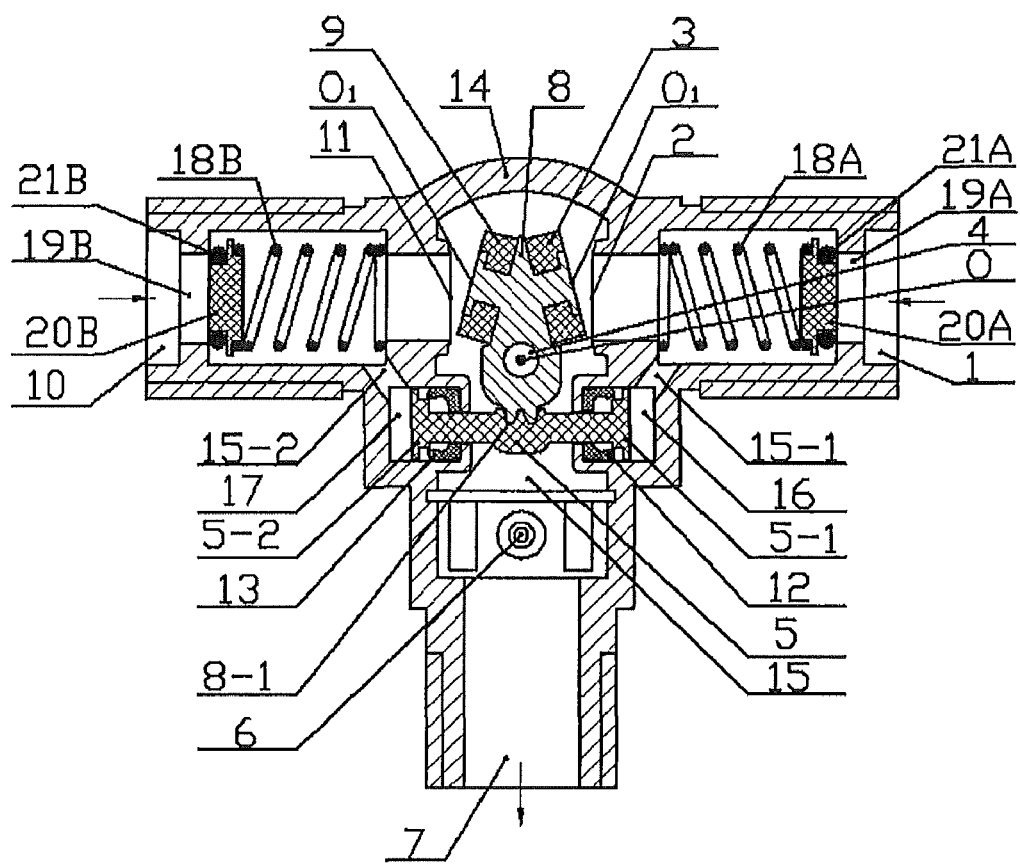

MIXING ADJUSTING THERMOSTATIC WATER VALVE WITH PRESSURE BALANCING DEVICE

FIELD OF THE INVENTION

The present invention relates to a liquid temperature adjusting valve, and more particularly, a mixing adjusting thermostatic water valve with a pressure balancing device that controls a temperature of mixed liquid by adjusting a mixture ratio of two kind of liquids at different temperatures as needed on the conditions of a high pressure, a high pressure difference and a large fluctuation of the pressure and pressure difference.

BACKGROUND OF THE INVENTION

A mixing adjusting thermostatic water valve has been disclosed in the Chinese patent journal (Publication No.: CN101070925), which employs a geared motor or a step motor as a rotation driver to rotate a water temperature adjusting block provided with soft sealed pads on both sides thereof in such a manner that the soft sealed pads on both sides of the adjusting block can be attached to a cold water adjusting port and a hot water adjusting port, respectively, so as to adjust an outlet water temperature after mixture. The mixing adjusting thermostatic water valve has advantages of a simple process, a large flow rate, a reduced power, a quick and smooth temperature adjustment, a temperature difference equal to zero between the inlet temperature and the outlet temperature, and a small volume due to a mixing water chamber provided therein. However, when the pressure difference between the cold water and the hot water as well as the fluctuation of pressure difference are relatively large, for example, when the instant pressure difference goes up to 0.1 Mpa or so, the mixing adjusting thermostatic water valve will suffer from instant cross flow of the cold and hot water such that the thermostatic speed is reduced. When the pressure difference between the cold and hot water is increased to higher than 0.3 Mpa, the thermostatic effect will hardly be achieved. It is provided, for the case that the hot water is centrally supplied, the hot water must be turned off or nearly turned off in a short time when the cold water supplying is stopped, so as to avoid scalding accident. However, the above mentioned patent will be difficult to realize the above requirement when the hot water pressure is higher than 0.3 Mpa; moreover, after the hot water and power are turned off, the state that the hot water is turned off may still hardly be kept even when the hot water pressure is lower than 0.3 Mpa. When the mixing adjusting thermostatic water valve is applied in a volumetric electric water heater, a cold water inlet of the volumetric electric water heater is provided with a safety valve. The safety valve functions as a one-way valve with a certain pressure difference when the cold water flows into the volumetric electric water heater. The hot water in the volumetric electric water heater flows out of the water heater together with the cold water from the one-way valve in equal amount. A dynamic resistance of the hot water when flowing out of the hot water port of the volumetric electric water heater is equivalent to the pressure difference between 0.005-0.02 Mpa. The cold water is directly supplied by an inlet water pipe of the water heater. The pressure difference between the cold water and the hot water flowing into the thermostatic water valve is rapidly and frequently varied as the inlet water flow changes. The mixing adjusting thermostatic water valve will not be able to keep the outlet temperature constant due to the large fluctuation of the pressure difference of the cold and hot water.

BRIEF SUMMARY OF THE INVENTION

An object of the present invention is to provide a mixing adjusting thermostatic water valve with a pressure balancing device, which has a lower requirement for producing parts, is easily assembled, and enables a preset outlet water temperature to approach to the temperature of the cold or hot water and to have a temperature difference even equal to zero. When the pressure difference between cold and hot water is higher than 0.6 Mpa and largely fluctuates, the mixing adjusting thermostatic water valve can still work; when the cold water is abruptly turned off during working, the mixing adjusting thermostatic water valve, even if the hot water pressure is increased to 0.8 Mpa, can immediately turn off the hot water till the flow becomes zero and maintain turning off the hot water even after the controller is out of power; and when the temperature difference between cold and hot water frequently varies to a small extent and the flow is reduced to 2 L/min, the mixing adjusting thermostatic water valve can still adjust the temperature steadily. Moreover, the mixing adjusting thermostatic water valve can adjust a large water flow in despite of its small volume.

In an aspect, the present invention sets forth a mixing adjusting thermostatic water valve with a pressure balancing device, comprising a valve body, a water temperature adjusting block and a temperature sensor. A cold water pipe and a hot water pipe in coaxial may be provided on left and right sides of the valve body, respectively. The valve body may be also provided with a mixing water pipe having a central axis perpendicular to a central axis of the cold water pipe and the hot water pipe. The cold water pipe, the hot water pipe and the mixing water pipe are communicated to one another to form an inner cavity. A portion of the cold water pipe extending to the inner cavity may be a cold water adjusting port, and a portion of the hot water pipe extending to the inner cavity may be a hot water adjusting port. A water temperature adjusting block may be disposed between the cold water adjusting port and the hot water adjusting port. A rotation driver output rotating shaft may hermetically pass through a wall of the valve body to fixedly connect with a swing center of the water temperature adjusting block in a shape of an inverted split cone. Soft sealed pads may be respectively mounted on two side conical surfaces of an upper part of the water temperature adjusting block, and can be attached to the cold water adjusting port or the hot water adjusting port. The temperature sensor may be provided in the inner cavity or the mixing water pipe of the valve body, and may have a temperature sensing signal output terminal connected to a thermostatic controller input terminal provided outside. An adjusting block tooth may be provided on a bottom of the water temperature adjusting block and may engage with a rack parallel to the central axis of the cold and hot water pipes. Left and right pressure balancing cavities may be respectively provided on both sides of a lower part of the inner cavity, and communicated to the adjacent cold water pipe or hot water pipe via a pressure transmission hole, respectively. Both ends, i.e. left and right ends, of the rack may respectively pass through inner sidewalls of the left and right pressure balancing cavities, may be positioned in the corresponding left and right pressure balancing cavities, and may be provided with left and right vertical platforms thereon respectively. A soft bowl type piston may be disposed between the left vertical platform and the inner sidewall of the left pressure balancing cavity or between the right vertical platform and the inner sidewall of the right pressure balancing cavity. In such way, a pressure balancing device can be formed. Moreover, one-way valves may be installed at inlets of the cold and hot water pipes, respectively.

The rack may be slip-fit with connecting holes in the inner sidewalls of the left and right pressure balancing cavities. A gap between the rack and the matched connecting hole is 0.03 mm-0.3 mm. A gap between the left vertical platform at one end of the rack and a peripheral wall of the corresponding left pressure balancing cavity and a gap between the right vertical platform at the other end of the rack and a peripheral wall of the corresponding right pressure balancing cavity may be 0.03 mm-0.3 mm, and a total sectional area of each gap may be far less than a cross-sectional area of the pressure transmission hole. One to four adjusting block teeth may be provided in the middle of the bottom of the water temperature adjusting block and engaged with the rack. If the two side conical surfaces of the upper part of the water temperature adjusting block respectively press against the cold water adjusting port or the hot water adjusting port, a distance between the corresponding vertical platform and the outer sidewall of the corresponding pressure balancing cavity may be no less than 0.5 mm. The soft bowl type piston may have a concave side surface facing the corresponding vertical platform at the end of the rack. A small boss, which matches with a shape of an inner cavity formed by the concave side surface of the soft bowl type piston, may be provided on the inner side of the vertical platform. The water temperature adjusting block may swing back and forth in respect to a central axis of the thermostatic water valve during working. The small boss may begin to socket-joint in the inner cavity of the corresponding soft bowl type piston, after a central axis of the water temperature adjusting block is positioned/swung within a range of 1/5-1/2 of a maximum swing angle of the water temperature adjusting block. An outer wall of the soft bowl type piston may contact with the pressure balancing cavity in a movable fit, and the inner cavity of the soft bowl type piston may contact with the corresponding small boss in a movable fit. A ratio between a plane area of the vertical platform at the end of the rack and a cross-sectional area of the hot water adjusting port or the cold water adjusting port and a ratio between a distance from a center $O_1$ of the soft sealed pad to a center $O$ of the rotation driver output rotating shaft and a radius of a reference circle of the adjusting block tooth are in a range of 1.1 and 2:1. The one-way valve may consist of a one-way valve seat, a one-way valve spring, a one-way valve seat and a one-way valve port, wherein the one-way valve spring is disposed between the one-way valve port and the cold water adjusting port or between the one-way valve port and the hot water adjusting port; the one-way valve seat sleeved onto one end of the one-way valve spring is pressed on the one-way valve port; and an O-shaped sealing ring is installed between the one-way valve seat and the one-way valve port.

During working, when the water temperature adjusting block adjusts the water temperature in the condition that an angle between the symmetric axis of the water temperature adjusting block and the central axis of the thermostatic water valve is in a small range, even though there is a larger pressure difference between the cold and hot water, the cold and hot water cannot cross flow with each other due to the one-way valves installed at the inlets of the cold and hot water adjusting ports. In such case, an impact force on the water temperature adjusting block exerted by the high pressure side water flow that flows out of the cold or hot water adjusting port is smaller than the one when the water temperature adjusting block approaches to the water temperature adjusting port, and thus makes a relatively smaller influence on rotation of the water temperature adjusting block. At this moment, the small boss on the end of the rack which is engaged with the adjusting block tooth does not contact with the inner cavity of the soft bowl type piston yet, and only a small flow of water flows into the inner cavity through the pressure transmission hole and the pressure balancing cavity. Because the flow is very small, it cannot influence water temperature adjustment. However, because the cross-sectional area of the pressure transmission hole for communicating the pressure balancing cavity with the cold water pipe or the hot water pipe is much larger than the total cross-sectional area of the gap between the rack and the matched connection hole, and also much larger than the total cross-sectional area of the gap between the vertical platform on the end of the rack and the peripheral wall of the corresponding pressure balancing cavity, a pushing force, which is equal to the product of the plane area of the vertical platform and the pressure difference between the high pressure side and the inner cavity, will be produced on the high pressure side to push the rack to horizontally move toward the low pressure side, and the soft sealed pad corresponding to the high pressure side will be pressed against the water temperature adjusting port on this side by the adjusting block tooth. Since a ratio between the cross-sectional area of the water temperature adjusting port (the hot or cold water adjusting port) and the plane area of the vertical platform on the end of the rack is slightly larger than a ratio between the distance from the center $O_1$ of the soft sealed pad of the water temperature adjusting block to the axial center $O$ of the rotating shaft of rotation driver and the radius of the reference circle of the adjusting block tooth, the force by which the rack pushes the soft sealed pads of the water temperature adjusting block toward the high pressure side adjusting port through the adjusting block tooth, after overcoming friction force, is substantially equal to the impact force exerted by the water flow out of the high pressure side adjusting port on the water temperature adjusting block at the corresponding high pressure side. When the water pressure on the cold water side or hot water side abruptly arises, a reaction force exerted by the rack on the adjusting block tooth would approach to balance with the impact force exerted by the water flow of the adjusting port on the water temperature adjusting block at this side, so that it will not bring about a problem of slowing down the water temperature adjusting speed and even being unable to adjust due to a too strong impact force on one side of the water temperature adjusting block produced by the pressure difference between the cold water side and the hot water side.

If the water temperature adjusting block performs a water temperature adjustment in the condition that the water temperature adjusting block is positioned near to one side of the cold or hot water adjusting port, the impact force on the water temperature adjusting block exerted by water flow out of the water temperature adjusting port at this side will increase. However, the small boss in the pressure balancing cavity at the same side starts to contact the inner cavity of the soft bowl type piston, so in this pressure balancing cavity, the small water flow that flows through the pressure transmission hole from an inlet tube at the same side into the inner cavity is gradually blocked. In the pressure balancing cavity at the same side, a pressure force equal to a product of the pressure difference between both sides of the platform and the plane area of the platform is exerted on the plane of the vertical platform at the end of the rack, and a force balance may be obtained because the pressure force counterbalances the impact force produced on the water temperature adjusting block by the water flow of the water temperature adjusting port at this side. If the supplying of cold water or hot water is abruptly stopped, the temperature sensor of the mixing adjusting water valve can sense whether the water temperature is too high or too low, and then the water temperature adjusting block can be driven by the rotation driver to turn to the hot or cold water adjusting port. At this time, in the pressure balancing cavity at the side to which water supplying is not stopped, the plane of the corresponding vertical platform at the end of the rack exerts a force on the rack so as to balance out the impact force of water flow out of the water temperature adjusting port (the cold or hot water adjusting port) on the same side, which is exerted on the top of the water temperature adjusting block. Therefore, even if the inlet pressure at the side to which water supplying is not stopped is higher than 0.8 Mpa, since the force for pressing the water temperature adjusting block toward the high pressure side adjusting port is stronger than the force exerted on the soft sealed pad by the water flow out of the adjusting port, and is still strong enough to push the upper part of the water temperature adjusting block moving towards the water temperature adjusting port at the side, to which the water supplying is not stopped, after overcoming a rebounding force of the soft bowl type piston and rubber gasket of the pressure balancing cavity, the water temperature adjusting port is sealed to have a water flow of approaching zero value and maintained in such state after the power is interrupted. Such state is particularly effective to avoid scalding accidence caused by continuous outflow of the hot water when the cold water supplying is abruptly stopped.

The rotating shaft of the rotation driver drives the water temperature adjusting block to swing from side to side around the shaft to change distances between the soft sealed pads on two side conical surfaces and the corresponding water temperature adjusting ports so as to change a proportion of the cold water and hot water, thereby adjusting the water temperature. The controlling process is as follows: when the temperature sensor senses the outlet temperature of the mixing water pipe is higher than a preset temperature, a controlling signal will be sent to the rotation driver, such that the upper part of the water temperature adjusting block swings toward the hot water adjusting port through the rotating shaft so as to reduce the flow of the hot water and increase the flow of the cold water; conversely, if the outlet temperature of the mixing water pipe is lower than the preset temperature, the upper part of the water temperature adjusting block swings to the cold water adjusting port. In case that there is not a pressure balancing device, the rotation driver in the process of adjusting the water temperature would have to overcome a resistance force produced when a pressure difference between the cold and hot water adjusting ports occurs. In such case, when the resistance force is no more than the driving force of the rotation driver, the rotation speed of the rotation driver will be slowed down, i.e. the speed of adjusting the temperature is reduced; and when the resistance force is so strong that the rotation driver will hardly rotate, the water temperature is unable to be adjusted.

The pressure balancing device is provided such that when the pressure difference between the cold and hot water adjusting ports is not more than 0.8 Mpa, the rotation driver is not affected by the temperature adjusting action, and when the cold water is turned off, after the circular soft sealed pad on the upper part of the water temperature adjusting block presses against the hot water adjusting port, the hot water can still be turned off even if the power of controller is interrupted.

The soft bowl type pistons are used to swing the water temperature adjusting block in the vicinity of the central axis of the thermostatic water valve to adjust the water temperature. The rack is located freely without other additional resistance force, so it can be adjusted flexibly. When the small boss is inserted into the soft bowl type piston till the upper part of the water temperature adjusting block presses against the corresponding water temperature adjusting port, both the soft bowl type piston and the platform at the end of the rack cannot create friction with the peripheral wall of the pressure balancing cavity, so the wear of the soft bowl type piston is greatly reduced, and its service life is thusly improved.

As compared with the prior art, the present invention has following prominent advantages:

1) A pressure balancing device is installed in the inner cavity of the mixing adjusting thermostatic water valve, if the mixing adjusting thermostatic water valve is used in a general central heating and water supplying system, it can stably adjust the outlet temperature by means of the pressure balancing device even through the pressure difference between the cold water and the hot water is more than 0.6 Mpa.

2) When the cold water supplying is stopped during working, even if the pressure of hot water reaches to 0.8 Mpa, the hot water can still be immediately turned off, so it ensures that the user will not be scalded. And this state can be maintained till the power of the mixing adjusting thermostatic water valve is interrupted.

3) The present invention, if applied to a volumetric electric water heater having a cold water port provided with a one-way valve, can solve the problem of unstable water temperature adjustment.

The mixing adjusting thermostatic water valve with the pressure balancing device according to the present invention is mainly installed at a terminal water supply port of the central hot water supplying system or an outlet end of the volumetric electric water heater to mix the cold water with the hot water rapidly to a predetermined outlet temperature.

BRIEF DESCRIPTION OF THE DRAWINGS

FIG. 1 is a structural schematic view of a mixing adjusting thermostatic water valve with a pressure balancing device according to one embodiment of the present invention, and the mixing adjusting thermostatic water valve may be utilized in a central hot water supplying system terminal or an electric water heater with a one-way valve at the inlet thereof.

DETAILED DESCRIPTION OF THE EMBODIMENTS

The present invention will be illustrated in detail with reference to the specific embodiments.

As shown in FIG. 1, a mixing adjusting thermostatic water valve with a pressure balancing device consists of a valve body 14, a cold water pipe 1, a hot water pipe 10, a mixing water pipe 7, a water temperature adjusting block 8, a temperature sensor 6, a cold water adjusting port 2, a hot water adjusting port 11, an inner cavity 15, a rotation driver output rotating shaft 4, a rack 5, a right pressure balancing cavity 16, a left pressure balancing cavity 17, and one-way valves. The cold water pipe 1 and the hot water pipe 10 are coaxially provided on left and right sides of the valve body 14 respectively. The mixing water pipe 7 is also provided on the valve body 14. A central axis of the mixing water pipe 7 is perpendicular to a central axis of the cold water pipe 1 and the hot water pipe 10. The cold water pipe 1, the hot water pipe 10 and the mixing water pipe 7 are communicated to one another to form the inner cavity 15, and the cold water adjusting port 2, the hot water adjusting port 11 and the water temperature adjusting block 8 corresponding thereto are provided inside the inner cavity 15. The rotation driver output rotating shaft 4 hermetically passes through circular orifices on walls of the valve body 14 to be fixedly connected with a swing center of the water temperature adjusting block 8. Circular soft sealed pads 3, 9 are respectively inserted onto two side conical surfaces of an upper part in the shape of inverted split cone of the water temperature adjusting block 8, and the two side conical surfaces can be respectively rotated to press against the cold water adjusting port 2 or the hot water adjusting port 11. The temperature sensor 6 is provided in the inner cavity 15 or the mixing water pipe 7 of the valve body 14, and has a temperature sensing signal output terminal connected to a thermostatic controller input terminal provided outside. An adjusting block tooth 8-1 is provided on a bottom of the water temperature adjusting block 8 and engages with the rack 5 which is parallel to the axis of the cold water pipe 1 and the hot water pipe 10. The left and right pressure balancing cavities 17, 16 are provided on two sides of a lower part of the inner cavity 15, respectively, wherein the left pressure balancing cavity 17 is communicated with the hot water pipe 10 via a left pressure transmission hole 15-2, and the right pressure balancing cavity 16 is communicated with the cold water pipe 1 via a right pressure transmission hole 15-1; both ends of the rack 5 pass through the inner sidewalls of the left and right pressure balancing cavities 17, 16 and are respectively positioned in the corresponding left and right pressure balancing cavities 17, 16; left and right vertical platforms 5-2, 5-1 are respectively mounted on both ends of the rack 5; Left and right soft bowl type pistons 13, 12 are disposed between the left and right vertical platforms 5-2, 5-1 and the inner sidewalls of the left and right pressure balancing cavities 17, 16; in such a way, a pressure balancing device is formed. Concave side surfaces of the soft bowl type pistons 13, 12 respectively face to the vertical platforms 5-2, 5-1 and small bosses on inner sides of the vertical platforms 5-2, 5-1 may be inserted into the concave side surfaces of the soft bowl type pistons 13, 12 respectively. The cross-sectional area of the pressure transmission hole 15-1, 15-2 is much larger than the cross-sectional area of a gap between the periphery of the rack 5 and connecting holes in the inner sidewalls of the left and right pressure balancing cavities 17, 16, and is also much larger than the total cross-sectional area of the gap between the peripheries of the left and right vertical platforms 5-2, 5-1 at the ends of the rack 5 and the peripheral walls of the corresponding left and right press balancing cavities 17, 16. When the two side conical surfaces of the upper part of the water temperature adjusting block 8 are rotated to attach to the cold water adjusting port 2 or the hot water adjusting port 11, the spaces between the left, right vertical platforms 5-2, 5-1 at the ends of the rack 5 and the outer sidewalls of the left, right pressure balancing cavities 17, 16 may be 0.5 mm. The ratio between the plane area of the left vertical platform 5-2 or the right vertical platform 5-1 and the sectional area of the hot water adjusting port 11 or the cold water adjusting port 2 is not smaller than the ratio between the distance from a center $O_1$ of the soft sealed pad 3 or 9 to an axis center O of the rotation driver output rotating shaft 4 and the radius of reference circle of the adjusting block tooth 8-1, with a ratio value in a range of 1.1-2:1. The one-way valves are installed at the inlets of the cold water pipe 1 and the hot water pipe 10, respectively. The one-way valves consist of a one-way valve spring 18A or 18B, a one-way valve seat 20A or 20B, and a one-way valve port 19A or 19B.

In this embodiment, the left pressure transmission hole 15-2 or the right pressure transmission hole 15-1 has a diameter of 3 mm and a sectional area of 7 mm² Both the gap between the periphery of the rack 5 and the connecting holes in the inner sidewalls of the left and right pressure balancing cavities 17, 16 and the gap between the peripheries of the left and right vertical platforms 5-2, 5-1 on the ends of the rack 5 and the peripheral walls of the corresponding left and right pressure balancing cavities 17, 16 are 0.03 mm, and the total sectional areas of the gaps are respectively about 1.2 mm² and 1 mm², which are much smaller than the sectional areas of the left and right pressure transmission holes 15-2, 15-1. In this embodiment, if a swing angle of the water temperature adjusting block 8 is 36°, the soft sealed pad 3 may be attached to the cold water adjusting port 2, or the soft sealed pad 9 may be attached to the hot water adjusting port 11; and at this swing angle, the left vertical platform 5-2 of the rack 5 has a distance of 0.5 mm from the outer sidewall of the left pressure balancing cavity 17, or the right vertical platform 5-1 of the rack 5 has a distance of 0.5 mm from the outer sidewall of the right pressure balancing cavity 16. The distances from the centers $O_1$ of the soft sealed pads 3, 9 to the axis center O of the rotation driver rotating shaft 4 are equal to the radius of reference circle of the adjusting block tooth 8-1. The cold or hot water temperature adjusting ports 2, 11 have a diameter of 7 mm. A ratio between the sectional area of the left/right vertical platform 5-2/5-1 in a shape of an ellipse at the end of the rack 5 and the sectional area of the cold/hot water adjusting port 2/11 is 1.6:1. The one-way valve ports 19A and 19B are provided at the inlets of the cold and hot water pipes 1, 10, respectively. The one-way valve spring 18A or 18B is installed between the one-way valve port 19A or 19B and the corresponding cold water adjusting port 2 or the hot water adjusting port 11, respectively. The one-way valve seat 20A or 20B positioned outside the one-way spring 18A or 18B presses toward the one-way valve port 19A or 19B, respectively. An O-shaped sealing ring 21A or 21B is installed between the one-way valve seat 20A or 20B and the corresponding one-way valve port 19A or 19B, respectively.

The inlets of the cold and hot water pipes 1, 10 are respectively provided with the one-way valves with the same structure such that the cold water cannot cross flow with the cold water.

When the water temperature adjusting block 8 performs an adjustment approximately at an angle of ±8° from the central axis of the valve body 14, even if there is a larger pressure difference between the cold water and hot water, the impact force on the water temperature adjusting block 8 at the higher pressure side is smaller than the one when the water temperature adjusting block 8 approaches to the cold water adjusting port 2 or the hot water adjusting port 11. At this moment, the small boss at the inner side of the left or right vertical platforms 5-2 or 5-1 at the end of the rack 5 is engaged with the adjusting block tooth 8-1, and does not contact with the soft bowl type piston 13 or 12; however, since the sectional area of the left pressure transmission hole 15-2 or the right pressure transmission hole 15-1 is much larger than the sectional area of the gap between the rack 5 and the connecting hole in the inner sidewall of the left or right pressure balancing cavity 17 or 16, or the total sectional area of the gap between the left or right vertical platform 5-2 or 5-1 of the rack 5 and the peripheral wall of the left or right pressure balancing cavity 17 or 16, the high pressure side of the left or right vertical platform 5-2 or 5-1 of the rack 5 would still exert a reaction force similar to the impact force, which is exerted on the water temperature adjusting block 8 by the water flow of the water temperature adjusting port at the same side, by means of the adjusting block tooth 8-1, so as to allow the pressure to be proximately balanced. Thusly, although the pressure difference between the cold water and the hot water is higher than 0.6 Mpa, the swinging of the water temperature adjusting block 8 cannot be influenced, thereby the water temperature adjusting effect will not be affected.

If the swing angle of the water temperature adjusting block 8 is larger than the angle of 8° from the central axis of the valve body 14, when the pressure difference between the cold and hot water is large and the water temperature adjusting block 8 presses toward the higher pressure side, the closer the water temperature adjusting block 8 approaches to the water temperature adjusting port, the stronger the impact force of the water flow at this side is exerted on the water temperature adjusting block 8. In such case, the concave side surface of the soft bowl type piston 13 or 12 in the left or right pressure balancing cavity 17 or 16 will contact with and then completely accommodate the corresponding small boss. That is to say, when the gap between the inner sidewall of the left or right pressure balancing cavity 17 or 16 and the soft bowl type piston 13 or 12 becomes zero gradually, the soft sealed pad 9 or 3 in the upper part of the water temperature adjusting block 8 presses toward the water temperature adjusting port 11 or 2 with the equivalent force, so as to balance the adjusting force. Likewise, although the pressure difference between the cold and hot water is higher than 0.6 Mpa, the swinging of the water temperature adjusting block 8 cannot be influenced, and thereby the water temperature adjusting effect will not be affected.

When the cold water is turned off, it is necessary to turn off the hot water immediately. In cooperation of the pressure balancing device and the rotation driver, even if the hot water pressure reaches to 0.8 Mpa, the hot water can be turned off completely. Moreover, if the power of the controller is interrupted at this time, and the rotation driver is out of work, the state that the hot water is turned off will be still maintained under the action of the pressure balancing device.

What is claimed is:

1. A mixing adjusting thermostatic water valve with a pressure balancing device, comprising a valve body, a water temperature adjusting block and a temperature sensor, wherein a cold water pipe and a hot water pipe are coaxially provided on left and right sides of the valve body, respectively; the valve body is also provided with a mixing water pipe having a central axis perpendicular to a central axis of the cold water pipe and the hot water pipe; the cold water pipe, the hot water pipe and the mixing water pipe are communicated to one another to form an inner cavity; a portion of the cold water pipe extending to the inner cavity forms a cold water adjusting port, and a portion of the hot water pipe extending to the inner cavity forms a hot water adjusting port; the water temperature adjusting block is disposed between the cold water adjusting port and the hot water adjusting port; a rotation driver output rotating shaft hermetically passes through a wall of the valve body to fixedly connect with a swing center of the water temperature adjusting block; the water temperature adjusting block is in a shape of an inverted split cone, has on an upper part thereof two side conical surfaces in which soft sealed pads are embedded, and can be attached to the cold water adjusting port or the hot water adjusting port; the temperature sensor is provided in the inner cavity or the mixing water pipe of the valve body, and has a temperature sensing signal output terminal connected to a thermostatic controller input terminal provided outside;

wherein an adjusting block tooth is provided on a bottom of the water temperature adjusting block and engages with a rack parallel to the central axis of the cold and hot water pipes; left and right pressure balancing cavities are respectively provided on both sides of a lower part of the inner cavity, and the left pressure balancing cavity is communicated to the adjacent hot water pipe via a left pressure transmission hole and the right pressure balancing cavity is communicated to the adjacent cold water pipe via a right pressure transmission hole; both ends of the rack respectively pass through inner sidewalls of the left and right pressure balancing cavities, are positioned in the corresponding left and right pressure balancing cavities and are provided with left and right vertical platforms thereon; soft bowl type pistons are disposed between the left vertical platform and the inner sidewall of the left pressure balancing cavity and between the right vertical platform and the inner sidewall of the right pressure balancing cavity, respectively; in such a way, the pressure balancing device is formed; and one-way valves are installed at inlets of the cold and hot water pipes, respectively.

2. The mixing adjusting thermostatic water valve with the pressure balancing device according to claim 1, wherein the rack is slip-fit with connecting holes in the inner sidewalls of the left and right pressure balancing cavities, a gap between the rack and the matched connecting hole is 0.03 mm-0.3 mm, a gap between the left vertical platform at one end of the rack and a peripheral wall of the corresponding left pressure balancing cavity and a gap between the right vertical platform at the other end of the rack and a peripheral wall of the corresponding right pressure balancing cavity are 0.03 mm-0.3 mm, and a total sectional area of each of the gaps is less than a cross-sectional area of the left and right pressure transmission holes.

3. The mixing adjusting thermostatic water valve with the pressure balancing device according to claim 1, wherein one to four adjusting block teeth are provided in the middle of the bottom of the water temperature adjusting block and engage with the rack; and if the two side conical surfaces of the upper part of the water temperature adjusting block respectively press against the cold water adjusting port or the hot water adjusting port, a distance between the corresponding vertical platform at the end of the rack and the outer sidewall of the corresponding pressure balancing cavity is no less than 0.5 mm.

4. The mixing adjusting thermostatic water valve with the pressure balancing device according to claim 1, wherein the soft bowl type piston comprises a concave side surface facing the corresponding vertical platform at the end of the rack; a small boss, which shape-matches with an inner cavity formed by the concave side surface of the corresponding soft bowl type piston, is provided on an inner side of the vertical platform and can begin to socket-joint in the inner cavity of the corresponding soft bowl type piston after a central axis of the water temperature adjusting block is positioned in a range of 1/5-1/2 of a maximum swing angle of the water temperature adjusting block.

5. The mixing adjusting thermostatic water valve with the pressure balancing device according to claim 1, wherein an outer wall of the soft bowl type piston contacts with the corresponding pressure balancing cavity in a movable fit, and the inner cavity of the soft bowl type piston contacts with the corresponding small boss in a movable fit.

6. The mixing adjusting thermostatic water valve with the pressure balancing device according to claim 1, wherein a ratio between a plane area of the vertical platform at the end of the rack and a cross-sectional area of the hot water adjusting port or the cold water adjusting port and a ratio between a distance from a center $O_1$ of the soft sealed pad to a center $O$ of the rotation driver output rotating shaft and a radius of a reference circle of the adjusting block tooth are in a range of 1.1 and 2:1.

7. The mixing adjusting thermostatic water valve with the pressure balancing device according to claim 3, wherein a ratio between a plane area of the vertical platform at the end of the rack and a cross-sectional area of the hot water adjusting port or the cold water adjusting port and a ratio between a distance from a center $O_1$ of the soft sealed pad to a center O of the rotation driver output rotating shaft and a radius of a reference circle of the adjusting block tooth are in a range of 1.1 and 2:1.

8. The mixing adjusting thermostatic water valve with the pressure balancing device according to claim 1, wherein the one-way valve consists of a one-way valve spring, a one-way valve seat and a one-way valve port, wherein the one-way valve spring is disposed between the one-way valve port and the cold water adjusting port or between the one-way valve port and the hot water adjusting port; the one-way valve seat provided on one end of the one-way valve spring is pressed against the one-way valve port; and an O-shaped sealing ring is installed between the one-way valve seat and the one-way valve port.

* * * * *